H. WHITE,

Assignor of part interest to C. H. FARGO, J. BENHAM, C. E. & S. M. FARGO.

Boots and Shoes.

No. 8,536. Reissued Jan. 7, 1879.

Witnesses:
F. B. Townsend
H. W. Munday

Inventor:
Hugh White
per Munday & Evarts,
Attorneys

N. PETERS, PHOTO-LITHOGRAPHER, WASHINGTON, D. C.

UNITED STATES PATENT OFFICE.

HUGH WHITE, OF CHICAGO, ILLINOIS, ASSIGNOR OF PART INTEREST TO CHARLES H. FARGO, JOHN BENHAM, CHARLES E. FARGO, AND SAMUEL M. FARGO.

IMPROVEMENT IN BOOTS AND SHOES.

Specification forming part of Letters Patent No. 190,655, dated May 8, 1877; Reissue No. 8,536, dated January 7, 1879; application filed October 5, 1878.

*To all whom it may concern:*

Be it known that I, HUGH WHITE, of Chicago, in the county of Cook and State of Illinois, have invented a new and useful Improvement in Shoes; and I do hereby declare that the following is a full, clear, and exact description of the construction and operation of the same, reference being had to the annexed drawings, making a part of this specification, and to the letters and figures of reference marked thereon.

Figure 1:
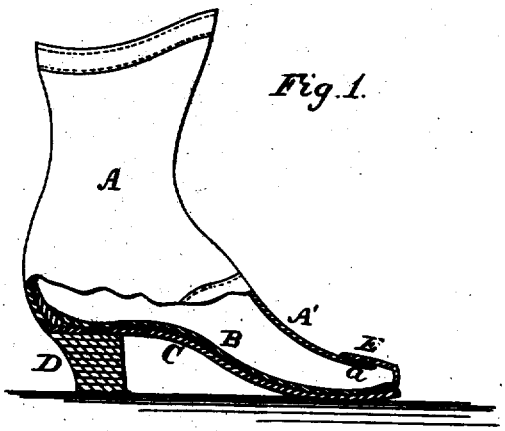
Figure 2:
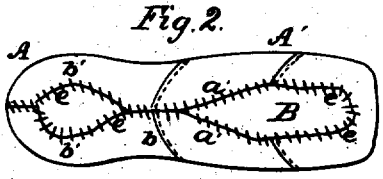
Figure 3:
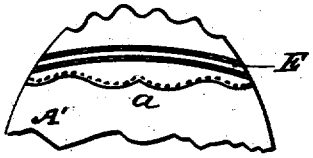
Figure 4:
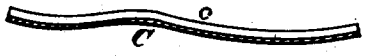
Figure 5:
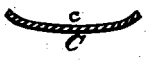

Figure 1 of the drawings is a representation of a front elevation of my shoe, part sectional; and Fig. 2, a bottom view without the sole. Figs. 3, 4, and 5 are detail views of the same.

In said drawings, A designates the quarters, and A′ the vamp, of a shoe; B, the insole; C, the outer sole; D, the heel, and E the skived sole-leather tip.

The vamp A′ terminates at its forward end or toe at *a*, thereby making it much shorter than those in general use. At or near this point *a* is sewed the skived sole-leather tip E, so that the tip is practically a continuation of said vamp.

The shape of the sole-leather tip, and also the stitches which fasten it to said vamp, are shown in Fig. 3. It is skived to a thin edge around the bottom to render the inside bottom of the shoe smooth, and is formed from a blank essentially segmental in shape, as clearly appears in Fig. 3.

Channels are formed in the upper surface of the sole-leather tip to receive the stitches and protect them from wear. This also appears in Fig. 3. This skived sole-leather tip is hammered into shape when wet, and when dry retains its shape.

The quarters, vamp, and tip, with lining, having been secured, are put upon a last. The lower edge of the skived sole-leather tip is bent around and under the toe of the last, and over the end of the upwardly-turned insole B, and the edges *a′* and *b′* of the vamp and quarters lapped on said insole. The form then assumed by the overlapping part of the skived sole-leather tip is shown in Fig. 2 of the drawings. Said tip is then sewed to the insole and to the lapping edges *a′* of the vamp by means of stitches *e*, and the lapping edges *a′* are brought together under the shank *b* of the insole, and the lapping edges *b′* of the quarters under the rear part of the heel of the insole, and there stitched. The sole C is then sewed or pegged after the usual manner.

The sole C is hollowed or recessed on its upper surface at *c*, as shown in Figs. 4 and 5, so as to prevent the stitches *e* from being worn unnecessarily.

The skived sole-leather tip E in my invention performs the function of a tip, and also that of a box-toe, with the following among other advantages: first, durability, as the sole-leather with its thick body and burnished surface will outwear any kind of upper-leather; second, saving in upper-leather, as the vamp ends where the outside box-toe begins.

I am aware that a tip, a sole, and a heel formed in one piece of gutta-percha or india-rubber are not new; also, that toe and heel boxings of sole-leather formed of the same piece as the sole and shaped and crimped in dies have heretofore been made; also, that shoes have been made with toe-guards or tips of copper, and perhaps, also, of stiff leather, which, however, not being fastened to the upper, permitted the accumulation of dirt and dust between the tip and upper, and were open to other objections; also, that it has been customary to cap or tip shoes with a foxing of soft or upper leather sewed to the upper, which, however, does not afford the desired protection or stiffening to the shoe at this point; also, that it has been usual to put stiff-leather forms or boxes inside the upper at the toe, which affords no protection to the upper; also, that the Letters Patent to me dated February 16, 1875, show an outside box-toe formed by turning up the end of a half-sole, and separate from both inner and outer sole, which construction, besides being objectionable for other reasons, is incapable of use in a shoe having only a single sole. All these prior forms I disclaim.

What I do claim is—

1. A boot or shoe provided with an outside box-toe and tip in one piece, made from sole-leather, separate from the sole and united to upper and sole, substantially as described.

2. A boot or shoe provided with an outside boxed toe and tip made from sole-leather, and with channels on its upper surface to receive and protect the stitches which connect it with the upper, as set forth.

3. A boot or shoe tip and box of sole-leather separate from the sole, skived at its edges all around, as set forth.

HUGH WHITE.

Witnesses:
SAM. M. FARGO,
EDW. S. EVARTS.